United States Patent [19]

Gütmann et al.

[11] 4,237,196

[45] Dec. 2, 1980

[54] SODIUM ION-CONDUCTING GLASS ELECTROLYTE FOR SODIUM-SULFUR BATTERIES

[75] Inventors: Gunter Gütmann, Esslingen; Holger Kistrup, Stuttgart; Friedrich G. K. Baucke, Mainz; Gerd Müller, Ergolding, all of Fed. Rep. of Germany

[73] Assignees: Deutsche Automobilgesellschaft mbH, Hanover; Jenaer Glaswerk Schott & Gen., Mainz, both of Fed. Rep. of Germany

[21] Appl. No.: 21,952

[22] Filed: Mar. 19, 1979

[30] Foreign Application Priority Data

Mar. 17, 1978 [DE] Fed. Rep. of Germany ....... 2811688

[51] Int. Cl.$^3$ .......................................... H01M 10/39
[52] U.S. Cl. ...................................... 429/50; 429/104; 429/193
[58] Field of Search .......................... 429/104, 193, 50

[56] References Cited

U.S. PATENT DOCUMENTS

| 3,404,035 | 10/1968 | Kummer et al. | 136/6 |
| 3,458,356 | 7/1969 | kummer et al. | 429/104 |
| 3,476,602 | 11/1969 | Brown et al. | 429/104 |
| 3,829,331 | 8/1974 | Tsang | 136/146 |
| 4,084,042 | 4/1978 | Ludwig | 429/104 |

*Primary Examiner*—Donald L. Walton
*Attorney, Agent, or Firm*—Browdy and Neimark

[57] ABSTRACT

An electrolyte glass for use as the solid electrolyte in high-temperature galvanic batteries, for example a sodium-sulfur battery. The glass electrolyte has relatively low resistivity and high corrosion resistance and is easily worked by glass manufacturing techniques. The composition of the glass electrolyte according to the invention is defined by $xNa_2O \cdot ySiO_2 \cdot zAl_2O_3$.

7 Claims, No Drawings

SODIUM ION-CONDUCTING GLASS ELECTROLYTE FOR SODIUM-SULFUR BATTERIES

BACKGROUND OF THE INVENTION

The necessity for an efficient use of energy and for the availability of powerful sources of stored electric energy has led to the development of storage batteries having a high energy content. Such storage batteries are for example the high temperature sodium-sulfur batteries. In such batteries, the negative active mass is sodium and the positive active mass is liquid sulfur or liquid sodium polysulfide. The two substances are separated from one another by a solid electrolyte which is capable of conducting sodium ions. The normal operating temperature of such a battery is between 280° and 350° C.

The known substances which may be used as the solid electrolyte in the aforementioned sodium-sulfur batteries include crystalline ceramics, for example β-alumina as well as non-porous, sodium ion-conducting glass. The conditions which an electrolyte glass must meet in sodium-sulfur batteries, are these:
1. A high conductivity for sodium ions.
2. Corrosion resistance against other components of the battery, especially the sodium, the sulfur or the sodium polysulfide, and
3. Workability.

In the early stages of development, a plurality of possible compositions for the glass electrolyte was cited, for example in U.S. Pat. No. 3,404,035 and U.S. Pat. No. 3,476,602. However, further development, for example as taught in U.S. Pat. No. 3,829,331, indicate that silicate glasses have insufficient corrosion resistance to sodium, sulfur, or sulfides and that borate glasses having a halogen component are more suitable for use as electrolytes.

A state of the art with respect to sodium-sulfur batteries with glass electrolytes is described in the article "The Dow Sodium-Sulfur Battery" published in the Proceedings of the 7th IECEC conference, San Diego, California, 1972 which also illustrates construction of such batteries. According to this article, the electrolyte is presented in the form of a large number of fibers or capillaries which have a specific resistivity of $5 \times 10^{+5}$ Ohmns-cm at the operational temperature. This high resistivity permits only a very low current density with the result that a 40 Ampere-hour battery requires 27,000 capillaries. Some of the glasses cited in U.S. Pat. Nos. 3,404,035 and 3,476,602 are said to have lower specific resistivities, but these glasses are not usable in practice due to their insufficient corrosion resistance.

OBJECT AND SUMMARY OF THE INVENTION

It is thus a principal object of the present invention to provide a glass electrolyte for use in sodium-sulfur batteries which has sodium ion conductivity substantially higher than that exhibited by any glass electrolyte heretofore known and high corrosion resistance with respect to the active masses within the sodium-sulfur battery. It is an associated object of the invention to provide a glass electrolyte which can be easily worked in a glass working facility.

These objects are attained according to the invention by providing an electrolyte glass which has substantially the following composition:

$$xNa_2O \cdot ySiO_2 \cdot zAl_2O_3$$

in which the ratio x/y lies between 0.52 and 0.92 and the ratio x/z lies between 2 and 20. It has been found that an electrolyte glass of the above composition exhibits the above listed qualities required in such a glass to a surprising degree.

A particularly effective glass electrolyte has been found to have the composition in which the ratio x/y is between 0.75 and 0.89 and the ratio x/z is between 2.7 and 4.

In the glass of this composition, the specific resistivity at an operational temperature of 300° C. has been found to lie between 700 and 3,000 Ohm-cm which is substantially lower than that found in presently used glass electrolytes. This property thus permits a substantially increased electrical current density and a substantial reduction in the number of capillary tubes required.

The electrolyte according to the invention may be used in the battery in any conceivable shape so long as it provides a relatively thin separating wall between the two active electrode In particular, the electrolyte may be present in the per se known shape of capillary tubes, flat or corrugatet or spiral plates or diaphragms and may be held and mounted within the battery housing in any suitable manner. Some of the constructions for glass electrolytes are taught in the literature references given above.

The glass electrolytes according to the present invention may also be used in other galvanic batteries in which sodium is the negative active mass, provided only that the positive mass does not cause corrosion of the electrolyte.

Furthermore, small amounts of foreign materials or impurities, or additives, for example purifying substances, may be present in and may be added to the electrolyte glass whose composition is given above, without thereby departing from the effective character of the described electrolyte.

The electrolyte glass according to the invention has been tested to determine its corrosion resistance with respect to the active mass of the sodium-sulfur battery in a number of tests both with and without electrical current flow. Some of these tests are summarized below.

DESCRIPTION OF EXEMPLARY EMBODIMENTS AND TEST RESULTS

EXAMPLE 1

A glass rod having the composition 32 M % $Na_2O$, 61 M % $SiO_2$ and 7M % $AL_2O_3$, corresponding to x/y=0.52 and x/y=4.57 was exposed to a melt of $Na_2S_4$ in a quartz ampoul at a temperature of 370° C. for a period of four weeks. The same treatment was given to a glass rod of the composition 40 M % $Na_2O$, 48 M % $SiO_2$ and 12 M % $Al_2O_3$, i.e., with x/y=0.83 and x/z=3.33. After the treatment, both rods were weighed and no weight loss was found. Furthermore, the leached solidified melt of $Na_2S_4$ was found to contain no significant amounts of aluminum. The two glass rods remained clear and transparent and showed no sign of corrosion.

EXAMPLE 2

A glass plate of the composition 40 M % $Na_2O$, 48 M % $SiO_2$ and 12 M % $Al_2O_3$, with x/y=0.83, x/z=3.33 was coated with sodium under vacuum and then exposed to sodium or sodium vapor for 24 hours at 300° C. After cooling and dissolving of the sodium with methanol, the surface was examined with a scanning electron microscope. The surface was found to be free from chemical attack.

EXAMPLE 3

A capillary tube made from glass of the composition in example 2, i.e., 40 M % $Na_2O$, 48 M % $SiO_2$ and 12 M % $Al_2O_3$ having an outer diameter of 0.1 cm and a length of approximately 5 cm was enlarged to a funnel at one end and sealed at the other end. The tube was then filled with mercury. The capillary tube was dipped into a reservoir of molten sodium with the exclusion of air and moisture such that the wetted surface of the capillary tube was 1 cm². The sodium and the mercury were contacted with nickel wires and the entire cell was placed in an apparatus in which a protective gas atmosphere was maintained at a temperature of 300° C. A current was applied in a manner making the mercury the negative pole until the sodium amalgam had risen to the edge of the funnel above the capillary tube. Subsequently, the current was reversed in polarity so that the sodium was electrolyzed out of the amalgam back into the outer reservoir. The current densities which were used are in the vicinity of 40 mA/cm². The specific resistivity of the glass was found to be 900 ohm-cm at 300° C.

EXAMPLE 4

A glass capillary tube of the composition cited in Example 1 and having an outer diameter of 0.1 cm was provided with an internal copper wire of a thickness of 0.02 cm. The glass capillary tube was dipped in a sodium reservoir so that the wetted surface was 1 cm². The wire extending from the capillary tube and another wire in contact with the sodium were connected to a galvanostat. In the presence of a protective gas, at a temperature of 300° C., at first a very low current density (0.1 mA/cm²) was used to electrolyze sodium from the outer reservoir into the interior of the capillary tube until the latter was filled. The current was then reversed. The capillary tube was found to sustain current densities up to 100 mA/cm² for short periods of time. The average current density was 40 mA/cm². The lifetimes of such half-cells are at least 12 Ah/cm².

EXAMPLE 5

A capillary made from glass according to the composition cited in Example 2 and having an outer diameter of 0.1 cm was filled with sodium and a copper wire was inserted in the capillary tube and sealed. The external portions of the copper wire were gold-coated by vapor deposition. The capillary tube was then dipped in a melt of pure $Na_2S_4$. Electrical contact to the polysulfide melt was made with a spiral wire of Molybdenum. This cell was charged and discharged in a suitable apparatus in the presence of a protective gas. The portion of the capillary tube which was not immersed in the sulfide melt served as the sodium reservoir so that the permeable surface of the capillary tube available for the reaction remained constant during the charging and discharging process.

It will be obvious to those skilled in the art that various changes may be made without departing from the scope of the invention and the invention is not to be considered limited to what is described in the specification.

What is claimed is:

1. A battery electrolyte formed by sodium ion conducting glass for use in sodium-sulfur batteries, having the composition $$xNa_2O.ySiO_2.zAl_2O_3$$

in which x/y lies between 0.52 and 0.92 and x/z lies between 2 and 20.

2. A glass electrolyte according to claim 1, having the composition $xNa_2O.ySiO_2.zAl_2O_3$  in which x/y lies in the range between 0.75 and 0.89 and x/z lies in the range between 2.7 and 4.

3. A glass electrolyte according to claim 1, and having the shape of a plurality of capillary tubes.

4. A glass electrolyte according to claim 1, and having the shape of at least one plate.

5. A method for using a glass electrolyte in a galvanic battery in which sodium is the active mass of the negative electrode, and in which the glass electrolyte has the composition $xNa_2O.ySiO_2.zAl_2O_3$ in which x/y lies between 0.52 and 0.92 and x/z lies between 2 and 20.

6. In a sodium-sulfur battery containing a solid electrolyte separating a negative active sodium mass from a positive active mass, the improvement wherein said electrolyte comprises the electrolyte of claim 1.

7. A battery electrolyte in accordance with claim 1 having a resistivity at 300° C. between 700 and 3,000 Ohm-cm.

* * * * *